United States Patent Office 3,580,825
Patented May 25, 1971

3,580,825
ELECTROLYTIC PROCESS FOR PURIFYING IRON DISSOLVED FROM SCRAP STEEL
Stanley Hills, Cherry Hill, N.J., assignor to ESB Incorporated
No Drawing. Filed Oct. 28, 1968, Ser. No. 771,319
Int. Cl. C22d 1/24
U.S. Cl. 204—112                                4 Claims

ABSTRACT OF THE DISCLOSURE

Iron sufficiently free of manganese impurities to be useful as active material in electrochemical cells is obtained in a continuous process by dissolving scrap steel containing an unacceptably high manganese content and subsequently plating out the iron but not much of the manganese. The pH of the electrolytic bath is maintained so the $H_2$ evolution will occur after iron deposition but before manganese deposition. The preferred conditions for the electrolytic bath are: a pH range from about 2.5 to about 3.0; a current density range from about 0.1 to about 0.25 amp/sq. in.; a ferrous ion concentration range from about 25 to about 40 gr./l.; and a supporting electrolyte concentration range from about ½ to about 1 mole/l.

BACKGROUND OF THE INVENTION

The iron, iron oxides, and mixtures thereof used as the active material in nickel-iron electrochemical cells are obtained by a succession of two processes. The first is essentially a purification process in which the undesirable impurities in the iron are held or reduced to below certain prescribed upper limits, while the second is essentially a conversion process in which the metallic iron is chemically converted in whole or in part to oxides of iron and in which the iron is also physically changed from large solid pieces of metallic iron into a mixture of iron and iron oxide powders.

While the present invention is concerned primarily with the first of these two processes and is basically an iron purification process, the second is mentioned both to show the utility of the purified iron as well as to point out that the purified iron may be used as the basic starting material in alternative second iron conversion processes. One such conversion process, a multistep chemical operation dating back to the days of Thomas Edison and still in use today, starts with purified iron, dissolves the iron, forms the iron into $FeSO_4 \cdot 7H_2O$ crystals, dries the crystals to produce $FeSO_4 \cdot 1H_2O$, roasts that product to obtain $Fe_2O_3$, reduces the $Fe_2O_3$ to Fe, and then partially oxidizes the Fe in the presence of steam to a mixture of Fe and $Fe_3O_4$ which is finely ground, screened, and blended. The purified iron produced by the process of this application could be used in that old Edison conversion process, either by being stripped from a cathode made from a material such as nickel on which the purified iron was deposited before being placed in the conversion process, or by removing the cathode with its iron deposit from the purification process and placing it into the conversion process. A more recent alternative conversion process is described in U.S. Pat. No. 3,345,212, issued to E. F. Schweitzer on Oct. 3, 1967 and owned by the assignee of this application; the cathode used in the present invention could, along with its purified iron deposit, become the anode in Schweitzer's conversion process.

Turning now to the purification processes with which this invention is primarily concerned, one of the impurities whose concentration must be limited is manganese. Excessive manganese impurity in iron active material results in an unacceptably low electrochemical efficiency. A manganese impurity concentration of not more than 200 parts per million (p.p.m.) by weight, and preferably not more than 100 p.p.m., is considered to be the maximum tolerable in iron active material for use in such cells.

Iron having a manganese impurity level not exceeding the acceptable maximum could be obtained either by carefully controlling the processes used in steel plants in the production of steel, or by taking a steel containing excessive amounts of manganese and purifying the steel so that the manganese content in the iron is reduced to within tolerable limits. The first approach is presently used to obtain purified iron, but it is objectionable for a variety of reasons. The mild steels normally produced by steel mills have manganese contents far in excess of that which can be tolerated in iron active material (e.g., 1000 p.p.m. or more), and so special batching and processing is necessary for the steel mills to produce the required low manganese steel. The unusually high temperatures required during this processing are harmful to the steel hearths. Also the disparity in the volumes of steel produced by steel mills and the iron used as active material by battery manufacturers is so great that the specially processed, low manganese steel produced occasionally by steel manufacturers to satisfy the particular needs of battery manufacturers may simultaneously seem to the steel producer as a tiny amount hardly worth bothering with and to the battery manufacturer as a year's supply of a needed raw material. The result to the battery manufacturer is a constant uncertainty that steel manufacturers will supply the needed material; also, the iron is relatively expensive per pound when it is supplied, and the battery manufacturer must frequently carry large inventories to accommodate his needs between infrequent shipments from suppliers.

This invention is based on the alternative approach of beginning with a steel containing excessive amounts of manganese and purifying the steel so that the manganese content in the iron is reduced to within tolerable limits. In broad terms the steel containing the excessive amounts of manganese impurities is electrolytically dissolved after which the iron but not much of the manganese is plated out. The starting raw material for this purification process may be, and preferably is, a mild scrap steel available at very low cost from a wide variety of sources.

SUMMARY OF THE INVENTION

Iron sufficiently free of manganese impurities to be useful as active material in electrochemical cells is obtained by electrolytically dissolving scrap steel containing an unacceptably high manganese content and subsequently plating out the iron but not much of the manganese. The pH of the electrolytic bath is maintained so the $H_2$ evolution will occur after iron deposition but before manganese deposition with the limits of the pH range set by a desire to obtain a deposit with as low a manganese content as possible and under conditions which will result in maximum net deposition rate; the preferred pH range is from about 2.5 to about 3.0. The upper limit of the current density range is a balance between the desire for high iron deposition rates and the desire to hold down the percentage of manganese impurity content, while the lower limit is established by production rate considerations and manganese impurity requirements; the preferred current density range is from about 0.1 to about 0.25 amp/sq. in. The upper limit of the $Fe^{++}$ ion concentration range is set at the point above which excessive precipitation of the iron as $FeSO_4$ will occur, while the lower limit is the concentration below which excessive manganese impurities will occur in the net iron deposit; the preferred $Fe^{++}$ ion concentration range is from about 25 to about 40 grams/liter. The upper limit of the supporting electrolyte concentration range is likewise set at the point above which excessive precipitation of the iron will occur, while the lower limit is set at the point below which the IR drop between the electrodes would become excessive. Depending on whether the deposited iron is to be stripped from or left on the cathode used in this process, the cathode may either be one such as nickel which permits easy stripping of the deposit or one such as iron which would tightly hold the iron deposit.

DESCRIPTION OF THE PREFERRED EMBODIMENTS

In general terms this invention is concerned with electrolytically dissolving a steel containing an unacceptably high manganese content and subsequently plating out the dissolved iron along with only an acceptable amount of manganese. Use is made of the principle that in strongly acid solutions $H_2$ gas evolution will occur after iron deposition but before manganese deposition. Current densities up to the rate of arrival of ferrous ions are used to cause iron deposits on the cathode, with small amounts of excess current going to produce $H_2$ gas rather than manganese deposits.

This invention seeks to achieve the production of iron deposits having manganese impurity contents not exceeding a preselected maximum and to do so at an economical production or output rate. Some discussion of the factors affecting the impurity content and the rate of production is in order to show the extent to which these two goals harmonize or conflict with each other.

The fact that the electrolytic solution is to be sufficiently acidic so that $H_2$ gas evoluation will occur after iron deposition but before manganese deposition suggests that the electrolyte used in this invention requires a certain minimum acidity (e.g., the pH may not exceed some maximum) in order to obtain the desired purity in the iron deposit. Beyond this the principal concern in increasing the acidity (decreasing the pH) of the electrolyte is the effect which changes will have on production speed.

At the outset of a discussion concerning production rates it should be clearly pointed out that there are two events which will occur simultaneously at the cathode. First, iron will deposit electrochemically at a rate which might be referred to as the "gross deposition rate." Second, some of the iron which has already been electrochemically deposited will dissolve chemically at a rate identified as the "cathodic dissolution rate." The difference between these two, which will be referred to as the "net deposition rate," is the rate at which practical production speeds should be stated. The fact that some of the previously deposited iron will chemically dissolve also affects the purity, for while the iron is dissolving a proportional amount of the previouly deposited manganese does not also dissolve. While the manganese content in the iron being electrochemically deposited might be within acceptable limits, the subsequent removal by chemical dissolution of some of the iron could cause the manganese content in the iron which is ultimately removed from the bath and used in batteries (the "net iron deposit") to be excessive; of course it is the manganese content in the latter which is of interest to the battery manufacturer or user.

The electrochemical deposition of iron occurs when $Fe^{++}$ ions arriving at the cathode are met by electrical current conducted to the cathode. To obtain a maximum "gross production rate" the rate of arrival of $Fe^{++}$ ions and the rate of arrival of the current ("current density") should be as great as possible, and to achieve maximum current efficiency the current density at the cathode should not exceed the rate of arrival of the $Fe^{++}$ ions. The rate of arrival of the $Fe^{++}$ ions in an unstirred solution is dependent upon the concentration of the $Fe^{++}$ ions in solution, but that rate is subject to an upper limit by solubility considerations; if an effort is made to enrich the $Fe^{++}$ ion concentration while maintaining a given pH, the problem is encountered that at sufficient $Fe^{++}$ ion concentrations any additional $Fe^{++}$ will cause the $Fe^{++}$ to precipitate out as ferrous sulfate in sulfuric acid. A lower limit on the arrival rate of $Fe^{++}$ ions exists because it is the manganese content in the net iron deposit which is important, and that manganese content will become excessive unless the rate of arrival of $Fe^{++}$ ions exceeds by a certain amount the rate at which iron chemically dissolves from the cathode deposit. Related to the idea expressed in the preceding sentence, the minimum $Fe^{++}$ arrival rate or concentration may be achieved either by placing the electrodes in electrolyte initially containing that minimum concentration or by placing the electrodes in an electrolyte containing less than the minimum and then running the process until the minimum $Fe^{++}$ concentration is reached. Under the latter alternative the cathodic deposits obtained before the minimum $Fe^{++}$ concentration is reached would contain excessive amounts of manganese, and so would have to be removed from the cathode before additional depositing proceeded or left on the cathode to be subsequently blended with much purer iron deposits.

Although concern for a high gross production rate suggests that the current density at the cathode should be made high, there is an upper limit on the current density dictated by the purity requirement. The current density cannot be made so high as to raise the potential of the cathode to the point where the manganese impurity content will exceed the acceptable maximum. Also, a current density much greater than that required to electrochemically deposit all of the arriving $Fe^{++}$ ions would be economically wasteful. Production rate considerations and the requirement to obtain a net iron deposit having an acceptable impurity content establish lower limits on the current density.

The pH of the electrolyte is also important, both to the purity and the net deposition rate of the iron deposits. As mentioned above, the concern for purity dictates that the electrolyte be of a certain minimum acidity. Beyond this, as the acid concentration of the electrolyte increases the cathode dissolution rate will also increase with the result that the net deposition rate decreases. Concern for high net deposition rates therefore places a limitation on the maximum acid concentration in the electrolyte.

Another factor affecting the purity of the cathodic deposit, the net deposition rate, and the efficiency with which current conducted to the cathode is utilized is the composition of the electrolyte, and both the particular components of the electrolyte and their concentration are important to the results obtained. One component of the electrolytic solution contains the $Fe^{++}$ and $Mn^{++}$ electrochemically active species. This component, which is preferably sulfuric acid, $H_2SO_4$, is used to adjust the pH of the electrolytic solution containing the $Fe^{++}$ and $Mn^{++}$ electrochemically active species because the anions of the other mineral acids are deleterious to the performance of alkaline batteries. As seen from the above discussion concerning pH its concentration is important and subject to upper and lower limitations. The electrolytic solution should also contain a supporting electrolyte, one which affects the electrical conductivity of the solution without taking part in the electrochemical reactions. Preferred supporting electrolytes are solutions of sulfates such as ammonium sulfate or sodium sulfate in order to exclude the anions of the other mineral acids. By affecting conductivity the supporting electrolyte affects the potential of the electrodes at which iron and manganese deposits are obtained, and hence affects the impurity concentration in the deposits. If too little supporting electrolyte is included in the solution the IR drop through the electrolytic bath becomes so great that manganese deposition is excessive, while if too much supporting electrolyte is added $FeSO_4$ will precipitate out.

Having discussed the factors affecting the purity of deposit and the net deposition rate and having established also that the factors are interrelated and subject to upper and lower limits, it remains necessary to establish those limits numerically.

The pH range of the electrolytic solution appears to be narrowly confined to a maximum of about 3.0 and a minimum of about 2.5. In electrolytes having a pH much above 3.0 the concentration of the manganese impurity quickly exceeds the acceptable limit of 200 p.p.m., while the net deposition rate becomes too low if the pH goes much below 2.5. Likewise the current density at the cathode should be between about 0.1 amp/sq. in. and 0.25 amp/sq. in.; below the lower limit the net plating rate becomes very slow, and above the upper limit the manganese impurity content becomes excessive. The preferred $Fe^{++}$ ion concentration is from about 25 grams/liter to about 40 grams/liter. Below this lower $Fe^{++}$ ion limit the manganese impurity content in the net iron deposit becomes too great, and above the upper limit the $Fe^{++}$ precipitates out as $FeSO_4$ at an excessive rate. Complementing the limits on pH, current density, and $Fe^{++}$ concentration, the preferred range of concentrations for the supporting electrolyte is from about ½ mole/liter to about 1 mole/liter.

From the fact that manganese dissolves at the anode at one rate and deposits at the cathode at another and lower rate it will be apparent that this process is one in which the manganese ion concentration in the electrolyte solution is continuously increasing. While there may be a manganese ion concentration beyond which excessive manganese impurities in the cathode deposit or other undesirable results begin to occur, acceptable deposit purity and production rates have been obtained in solutions having a manganese ion concentration of 15 gr./l. when the other parameters were a pH of 2.5, a current density of 0.1 amp/sq. in., an $Fe^{++}$ ion concentration of 25 gr./l., and an ammonium sulfate supporting electrolyte concentration was 1.0 mole/liter. Should the $Mn^{++}$ ion concentration become excessive a fresh electrolytic bath can be substituted for the old contaminated one.

The particular material used for the cathodic substrate may depend upon whether the deposited iron is to be left on or removed from the substrate. A substrate material such as iron will securely hold the iron deposit, while a material such as nickel should be used if the deposit is to be stripped from the substrate.

Several examples will serve to illustrate the invention.

EXAMPLE I

A scrap steel anode and a nickel cathode were placed in an electrolyte containing an $Fe^{++}$ concentration of 25 gram/liter and an ammonium sulfate supporting electrolyte having a concentration of 1 mole/liter. The pH was about 2.5 and the cathodic current density was 0.1 amp/sq. in.

An iron deposit containing 59 p.p.m. manganese impurity was obtained on the cathode at the rate of 0.080 gram per square inch per hour.

EXAMPLE II

The conditions were the same as in Example I, except that the cathodic current density was 0.25 amp/sq. in.

An iron deposit containing 57 p.p.m. manganese impurity was obtained on the cathode at the rate of 0.104 gram per square inch per hour.

EXAMPLE III

The conditions were the same as in Example I, except that the $Fe^{++}$ ion concentration was 38 grams/liter.

An iron deposit containing 49 p.p.m. manganese impurity was obtained on the cathode at the rate of 0.080 gram per square inch per hour.

EXAMPLE IV

The conditions were the same as in Example I, except that the supporting electrolyte concentration was 0.5 mole/liter, the pH was about 3.0, and the cathodic current density was 0.25 amp/sq. in.

As iron deposit containing 200 p.p.m. manganese impurity was obtained on the cathode at the rate of 0.098 gram per square inch per hour.

EXAMPLE V

The conditions were the same as in Example I, except that the $Fe^{++}$ concentration was 50 grams/liter and the cathodic current density was 0.25 amp/sq. in.

An iron deposit containing 124 p.p.m. manganese impurity was obtained on the cathode at the rate of 0.092 gram per square inch per hour.

I claim:
1. An electrolytic process for purifying iron which comprises:
   (a) placing an anode containing iron and manganese in an electrolyte bath comprising sulfuric acid and a supporting electrolyte;
   (b) placing a cathode in the electrolytic bath;
   (c) maintaining the pH of the electrolytic bath within the range of about 2.5 to about 3.0; and
   (d) passing a current between the anode and the cathode in the bath at a current density within the range of about 0.1 to about 0.25 amp/sq. in.

2. The process of claim 1 in which the concentration of the ferrous ions obtained during the process of claim 4 is maintained in the range from about 25 to about 40 grams/liter.

3. The process of claim 1 in which the supporting electrolyte is a sulfate solution having a concentration in the range from about ½ to about 1 mole/liter.

4. The process of claim 2 in which the supporting electrolyte is a sulfate solution having a concentration in the range from about ½ to about 1 mole/liter.

References Cited

UNITED STATES PATENTS

| | | | |
|---|---|---|---|
| 2,385,269 | 9/1945 | Globus | 204—112 |
| 3,175,965 | 3/1965 | Sato et al. | 204—112 |

PATRICK P. GARVIN, Primary Examiner